(12) United States Patent
Okamachi et al.

(10) Patent No.: US 8,899,667 B2
(45) Date of Patent: Dec. 2, 2014

(54) STRUCTURE OF VEHICLE BODY REAR PART

(71) Applicant: Suzuki Motor Corporation, Shizuoka-ken (JP)

(72) Inventors: Yuji Okamachi, Shizuoka-Ken (JP); Tomohiro Tanaka, Shizuoka-Ken (JP); Kensaku Ito, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/726,810

(22) Filed: Dec. 26, 2012

(65) Prior Publication Data

US 2013/0169005 A1  Jul. 4, 2013

(30) Foreign Application Priority Data

Dec. 28, 2011 (JP) .................. 2011-288620

(51) Int. Cl.
*B62D 25/20* (2006.01)
*B62D 25/08* (2006.01)
*B62D 25/02* (2006.01)
*B62D 25/24* (2006.01)

(52) U.S. Cl.
CPC ................ *B62D 25/08* (2013.01); *B62D 25/02* (2013.01); *B62D 25/087* (2013.01); *B62D 25/24* (2013.01)
USPC .......................... 296/203.04; 296/204; 296/30

(58) Field of Classification Search
CPC ....... B62D 25/02; B62D 25/08; B62D 25/087
USPC .............. 296/203.01, 203.04, 193.08, 29, 30, 296/204
See application file for complete search history.

(56) References Cited

U.S. PATENT DOCUMENTS 5,611,592 A * 3/1997 Satou et al. .............. 296/203.04
6,811,211 B2 * 11/2004 Saito ........................ 296/203.02
8,276,966 B2 * 10/2012 Souma et al. ................ 296/37.2

FOREIGN PATENT DOCUMENTS

| JP | 3012621 | 3/1991 |
| JP | 2006218995 | 8/2006 |
| JP | 2009-35170 | * 2/2009 |

* cited by examiner

*Primary Examiner* — Dennis H Pedder
(74) *Attorney, Agent, or Firm* — Lerner, David, Littenberg, Krumholz & Mentlik, LLP

(57) ABSTRACT

A vehicle rear body part includes a rear side member provided on both sides of a rear floor and a lower part of a back door opening section higher than the rear side member. The rear floor is divided into a main rear floor panel and left and right side rear floor panels with the rear side member placed therebetween. In the rear side member, rear side member upper panels are configured to close an opening in an upper part and joined to flanges on both the left and right sides. Upright sections are provided at rear ends of the rear side member upper panels. The upright sections are joined to a lower part of the opening section. The upper panels, the rear side member, and the floor panels and are joined in three layers in the flanges of the upper panels.

2 Claims, 5 Drawing Sheets

STRUCTURE OF VEHICLE BODY REAR PART

CROSS-REFERENCE TO RELATED APPLICATIONS

The present application claims priority under 35 U.S.C. §119 from Japanese Patent Application No. 2011-288620 filed Dec. 28, 2011, the disclosure of which is incorporated herein by reference in its entirety.

TECHNICAL FIELD

The present invention relates in particular to the structure of a vehicle body rear part of a hatchback type vehicle including a back door.

BACKGROUND

Among vehicles, there are automobiles of the hatchback type including a back door. In a vehicle body rear part of the vehicle of this type, a back door opening section having a round structure opened and closed by the back door is provided.

In the past, as a method of securing rigidity of the vehicle body rear part of such a vehicle, a high-rigidity section by a closed cross section of the round structure of the back door opening section and a rear side member section of a rear floor of a vehicle body basic structure are coupled and reinforced However, in the structure of the vehicle body rear part in the past explained above, the high-rigidity section of the round structure of the back door opening section is provided in a position higher than the rear side member section of the rear floor of the vehicle body basic structure. The high-rigidity section of the round structure and the rear side member section of the vehicle body basic structure are laid out apart from each other in a vehicle up-down direction. In this case, it is necessary to add a separate bracket as disclosed in Japanese Patent Laid-Open No. 2006-218995 or substantially extend the high-rigidity section of the round structure of the back door opening section downward in the vehicle as shown in Japanese Examined Utility Model Publication No. H3-12621 to couple the high-rigidity section and the rear side member section. Therefore, in the structure of the vehicle-body rear part in the past, an increase in weight and an increase in costs are caused. Furthermore, it is likely that rigidity in the length direction is deteriorated because the high-rigidity section is vertically long.

In the structure of the vehicle body rear part in the past, when the rear side member section and a closed cross-sectional section in the vehicle width direction of the round structure of the back door opening section are coupled using a reinforcing member, there is a problem in that a load in the up-down direction from the round structure of the backdoor opening section cannot be efficiently transmitted to the rear side member.

BRIEF SUMMARY

The present invention has been devised in view of such actual circumstances, and it is an object of the present invention to provide the structure of a vehicle body rear part that can efficiently disperse a load of vehicle body twisting deformation of a round structure of a back door opening section rotating on a surface perpendicular to a vehicle front-back direction axis to vehicle body structures such as a rear floor and a rear wheel house through a closed cross-sectional section of a pillar section, upright sections of rear side member upper panels, and a rear side member, can be integrally assembled in a vehicle body assembly process without using an additional tightening component, and can secure assembly rigidity of components.

In order to solve the problems, the present invention provides the structure of a vehicle body rear part in which a back door opening section of a round structure is provided in a vehicle body rear part, a rear side member hat-shaped in cross section opened in an upper part that extends in a vehicle front-back direction is provided on both left and right sides of a rear floor, a lower part of said back door opening section is provided in a position higher than said rear side member, said rear floor is divided into a rear center floor and rear side floors on both the left and right sides with said rear side member placed therebetween in a vehicle width direction, and rear wheel house inner panels are arranged adjacent to said rear side member. In said rear side member, rear side member upper panels configured to close an opening in an upper part and joined to flanges on both the left and right sides are provided. Upright sections extending upward in the vehicle are provided at rear ends of said rear side member upper panels. The upright sections are joined to a lower part of the round structure of said back door opening section. Said rear side member upper panels, said rear side member, and said rear center floor or said rear side floors are joined in three layers in the flanges of said rear side member. Said rear side member upper panels are joined to said rear wheel house inner panels.

In the present invention, in outer side sections of said rear side member upper panels, joining flanges standing upright opposed to said rear wheel house inner panels are provided along the vehicle front-back direction. Said rear side member upper panels are joined to said rear wheel house inner panels via said joining flanges.

Furthermore, in a position higher than said rear side member upper panels, a closed cross-sectional section in the lower part of said back door opening section is provided. Both left and right side portions in the vehicle width direction and standing portions standing from both the left and right side portions in a lower portion of the round structure of said back door opening section are configured by a pillar section. Said pillar section standing from the lower part of said back door opening section is formed by a continuous closed cross section. The upright sections of said rear side member upper panels are joined to a member that forms the closed cross section of said pillar section.

Figure 1:
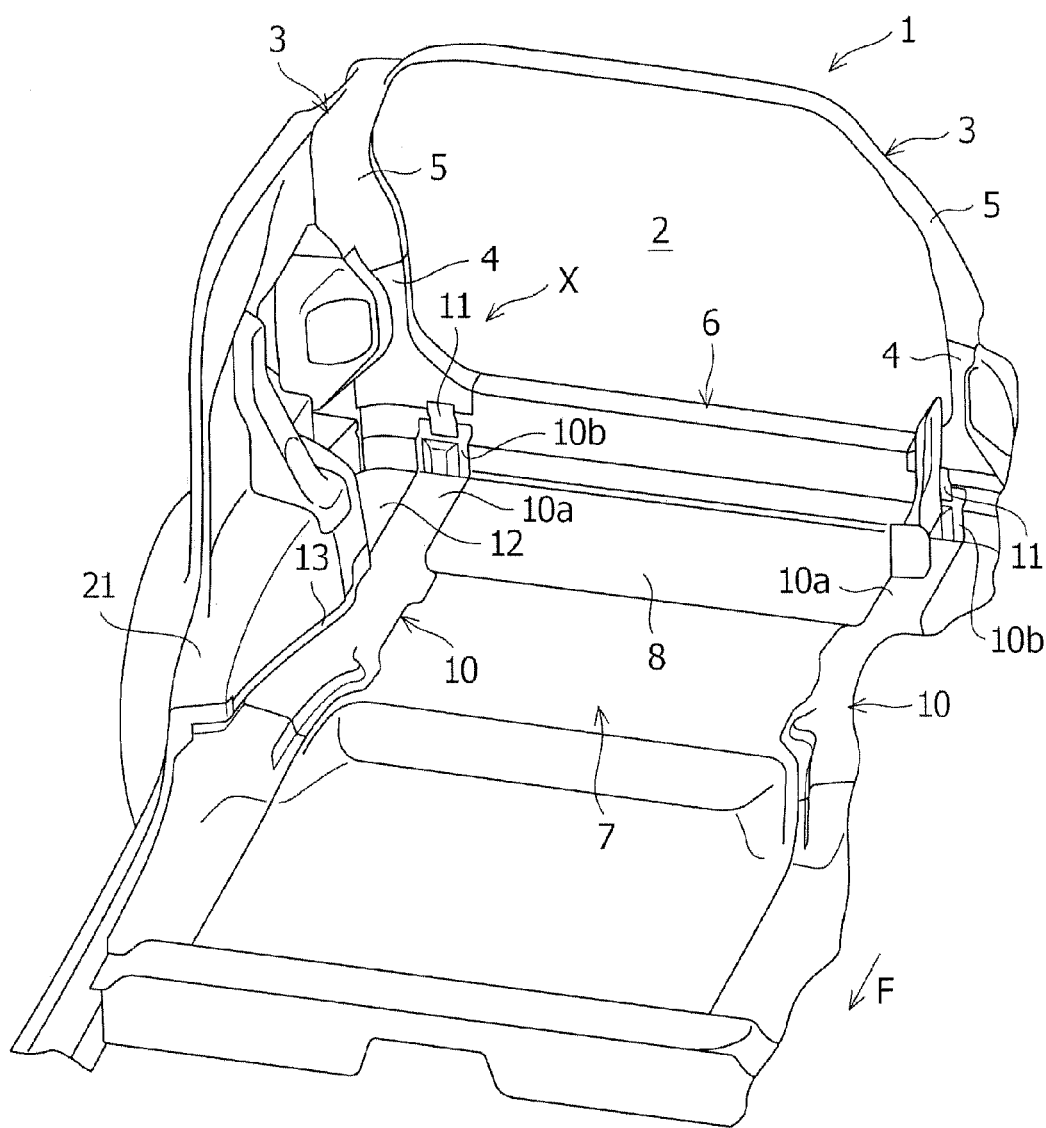
FIG. 1 is a perspective view of a vehicle body rear part of a vehicle, to which structure according to an embodiment of the present invention is applied, viewed obliquely from the front.
Figure 2:
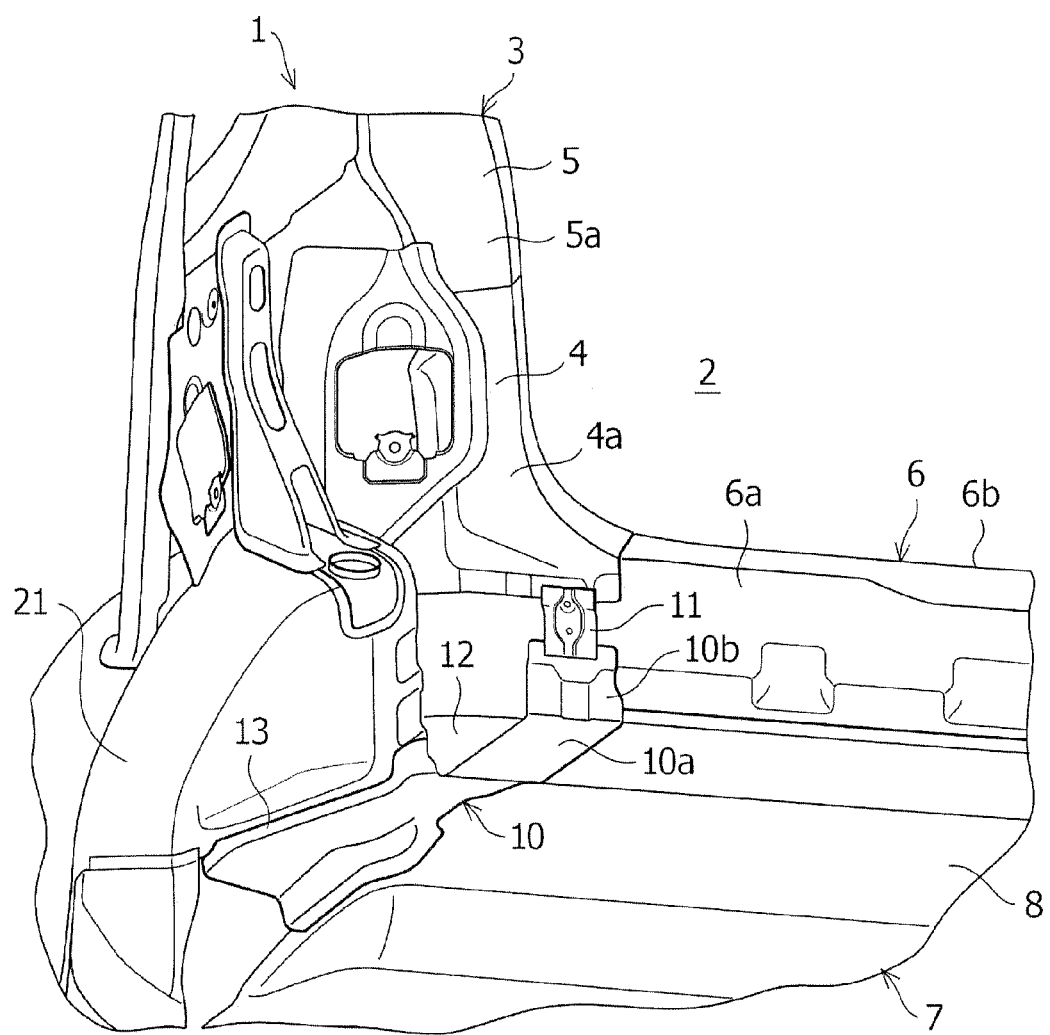
FIG. 2 is a perspective view showing an X part in FIG. 1 in enlargement.
Figure 3:
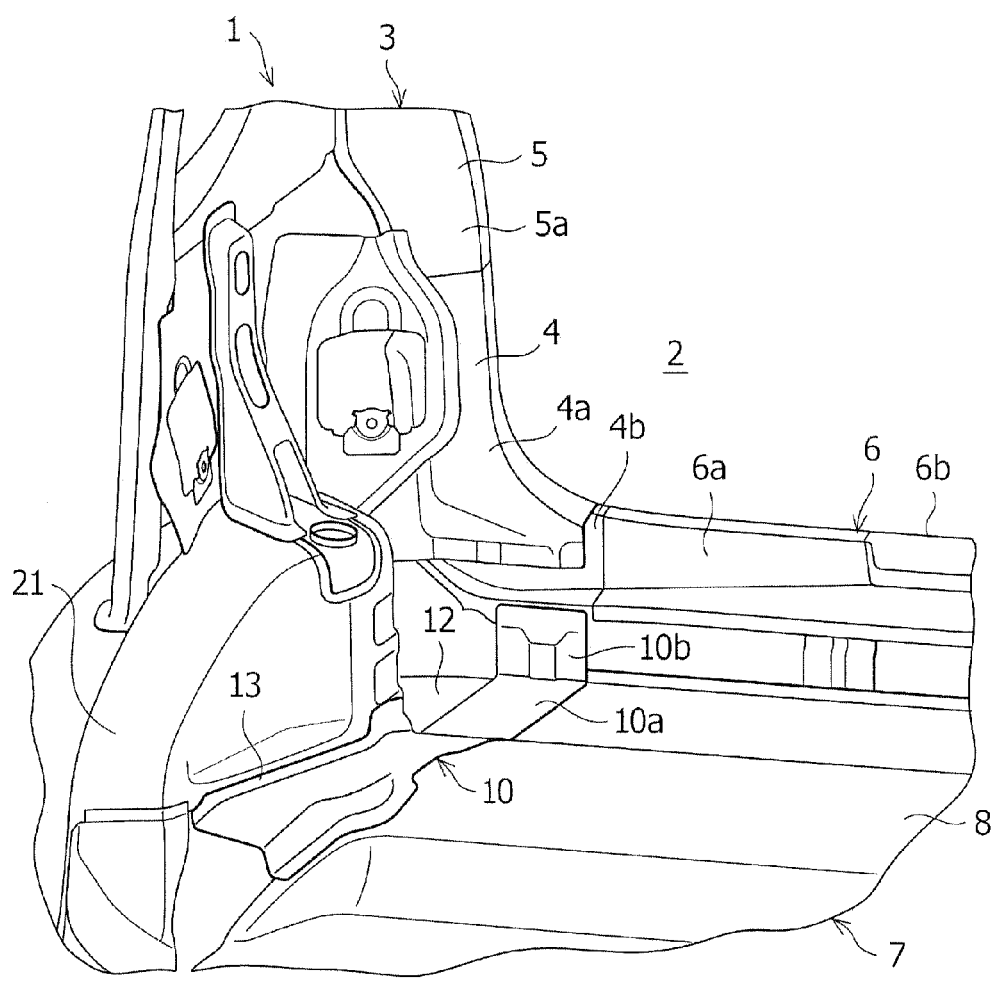
FIG. 3 is a perspective view showing an arrangement relation of components in the periphery of upright sections of rear side member upper panels in the vehicle body rear part of the vehicle to which the structure according to the embodiment of the present invention is applied.

The following is a list of reference signs used in in the Figures:

1 vehicle body rear part
2 back door opening section
3 pillar section
4 pillar lower panels
4a pillar inner lower panels
4b pillar outer lower panels
5 pillar upper panels
5a pillar inner upper panels
6 back panel section
6a back inner panel
6b back outer panel
7 rear floor
8 main rear floor panel (rear center floor)
9 rear side member
10 rear side member upper panels
10a horizontal sections
10b upright sections
11 reinforcing members
12 side rear floor panels (rear side section floors)
13 joining flanges
14 flanges
21 rear wheel house inner panels
L1 width dimension of upright sections of the rear side member upper panels
L2 width dimension of the rear side member
S1 first closed cross-sectional section
S2 second closed cross-sectional section

DETAILED DESCRIPTION

As explained above, in the structure of the vehicle body rear part according to the present invention, a back door opening section of a round structure is provided in a vehicle body rear part, a rear side member hat-shaped in cross section opened in an upper part that extends in a vehicle front-back direction is provided on both left and right sides of a rear floor, a lower part of said back door opening section is provided in a position higher than said rear side member, said rear floor is divided into a rear center floor and rear side floors on both the left and right sides with said rear side member placed therebetween in a vehicle width direction, and rear wheel house inner panels are arranged adjacent to said rear side member. In said rear side member, rear side member upper panels configured to close an opening in an upper part and joined to flanges on both the left and right sides are provided. Upright sections extending upward in the vehicle are provided at rear ends of said rear side member upper panels. The upright sections are joined to a lower part of the round structure of said back door opening section. Said rear side member upper panels, said rear side member, and said rear center floor or said rear side floors are joined in three layers in the flanges of said rear side member. Said rear side member upper panels are joined to said rear wheel house inner panels. Therefore, it is possible to secure, with the rear side member upper panels, joining rigidity of the rear floor including the round structure of the back door opening section, the rear side member, and the rear wheel house. It is possible to efficiently disperse loads of vehicle body twisting deformation, which is deformation of the round structure of the back door opening section rotating on a surface perpendicular to a vehicle front-back direction axis, and bending deformation in the entire vehicle body length to vehicle body structures such as the rear floor and the rear wheel house inner panels through the closed cross-sectional section of the pillar section, the upright sections of the rear side member upper panels, and the rear side member. It is possible to reliably suppress the vehicle body twisting deformation and the like. Moreover, with the structure of the vehicle body rear part according to the present invention, it is possible to disperse an external load, which is applied from the vehicle back, to the vehicle body rear part structure. In other words, a load received by a rear bumper is transmitted to the vehicle body rear part, in particular, the back panel section and the round structure of the back door opening section by a bumper member suspension member or the like and dispersed to the rear side member and the rear floor. At this point, the load is directly transmitted from the round structure of the back door opening section to the rear side member through the rear side member upper panels and dispersed to the rear floor and the rear wheel house inner panels mainly through the rear side member upper panels.

A reason for this is that, in order to suppress vehicle body twisting deformation in a hatchback type vehicle or the like, it is desirable to receive the load of the vehicle body twisting deformation right under the pillar section, which is the structure in the up-down direction of the backdoor opening section and disperse the load to the rear side member having rigidity. In the bending deformation in the entire vehicle body length, the up-down direction movement of the round structure of the back door opening section is supported. This is because a rate of contribution of the rear side member via the pillar section is large.

With the structure of the vehicle body rear part according to the present invention, unlike the structure in the past, it is unnecessary to use the additional bottle tightening component. It is possible to integrally assemble the structure of the vehicle body rear part with spot welding or the like in a vehicle body assembly process. Therefore, it is possible to secure assembly rigidity of components and realize improvement of productivity of the vehicle. Moreover, if the thickness of only the rear side member upper panels is increased, it is possible to improve coupling rigidity of peripheral components to the rear side member, the back panel, and the pillar outer panel. Therefore, as explained above, it is possible to secure necessary rigidity with a configuration including a small number of components and a minimum increase in weight. Furthermore, since the rear side member upper panels have a degree of freedom in the order of joining work, it is possible to freely select and perform the joining work according to a state of progress such as during side member assembly, during rear wheel assembly, and during floor formation.

In the present invention, in outer side sections of said rear side member upper panels, joining flanges standing upright opposed to said rear wheel house inner panels are provided along the vehicle front-back direction. Said rear side member upper panels are joined to said rear wheel house inner panels via said joining flanges. Therefore, while a load of the vehicle body rear part is dispersed in a joining section of the rear side member and the rear floor divided into three, since surface rigidity of the wheel house inner panel formed by a spherical curved shape is high, it is possible to receive a larger load. In particular, when the rear side member receives a load in the vehicle front direction in a moving load from the vehicle back to the vehicle front, in normal structure, the load is transmitted to a vehicle body structure such as a cross member in a front part of the rear floor. Only load absorption in the rear floor is sometimes insufficient. At this point, if it is possible to efficiently transmit the load applied to the rear side member to the rear wheel house inner panels, it is possible to improve load absorption of the vehicle body rear part. With the structure of the vehicle body rear part according to the present invention, it is possible to deform the entire spherical surface of the rear wheel house inner panels. Therefore, it is possible to absorb the moving load in the vehicle front direction in the entire rear wheel house inner panels. Moreover, it is possible to obtain an effect of load dispersion greater than an effect obtained when the rear wheel house inner panels and the rear side member upper panels are joined by normal horizontal flanges. During assembly, it is easier to attach the rear side member upper panels having rigidity that have a short dimension in the vehicle width direction and less easily bend than to position and join the large and flat rear floor that easily bends. Since the upright joining flanges are provided, in the rear side member upper panels, it is possible to easily perform, in a degree of freedom of selection in the order of the joining work, in particular, assembly work for the side members and assembly work for the rear wheel.

Furthermore, in the present invention, in a position higher than said rear side member upper panels, a closed cross-sectional section in the lower part of said back door opening section is provided. Both left and right side portions in the vehicle width direction and standing portions standing from both the left and right side portions in a lower portion of the round structure of said back door opening section are configured by a pillar section. Said pillar section standing from the lower part of said back door opening section is formed by a continuous closed cross section. The upright sections of said rear side member upper panels are joined to a member that forms the closed cross section of said pillar section. Therefore, it is possible to quickly transmit an external load, which is applied from the vehicle back, to the rear side member upper panels and the rear side member and more effectively utilize a load dispersion effect.

The present invention is further explained in detail below on the basis of an embodiment shown in the figures.

FIGS. 1 to 6 show the structure of a vehicle body rear part according to the embodiment of the present invention.

A vehicle to which the structure according to the present invention is applied is, as shown in FIGS. 1 to 4 and FIG. 6, an automobile of a hatchback type including a back door (not shown in the figures). In a vehicle body rear part 1 of the vehicle, a back door opening section 2 of a round structure opened and closed by the back door (not shown in the figures) is provided. Both left and right side portions in the vehicle width direction of the back door opening section 2 and standing portions in the vehicle up down direction standing upward from both the left and right side portions are configured by a pillar section 3. The pillar section 3 includes pillar lower panels 4 having an L shape in front view arranged at lower side corners of the back door opening section 2 and pillar upper panels 5 arranged to be coupled to upper parts of the pillar lower panels 4 and extending along the vehicle up down direction. The pillar lower panels 4 and the pillar upper panels 5 are respectively formed in closed cross-sectional shapes by joining pillar inner lower panels 4a on the inner side and pillar outer lower panels 4b on the outer side each other and joining pillar inner upper panels 5a on the inner side and pillar outer upper panels (not shown in the figures) on the outer side to each other.

Moreover, a back panel section 6 joined to inner side ends of the pillar lower panels 4 is disposed along the vehicle width direction between lower ends of the pillar section 3. The back panel section 6 is configured by joining a back inner panel 6a on the inner side and a back outer panel 6b on the outer side.

An upper part of the back inner panel 6a is bent obliquely upward toward the vehicle back. In FIG. 1, an arrow F direction indicates the vehicle front.

In a lower part of the vehicle body rear part 1 in this embodiment, as shown in FIGS. 1 to 4 and FIG. 6, a rear floor 7 extending in the vehicle front-back direction and the vehicle width direction is provided. The rear floor 7 is configured to be divided into a main rear floor panel 8 of a rear center floor and side floor panels 12 of rear side floors with a rear side member 9 placed therebetween in the vehicle width direction. The main rear floor panel 8 is arranged in the middle portion of the rear floor 7. The side floor panels 12 are respectively arranged in both the left and right side portions of the rear floor 7.

The rear side member 9 is arranged in both the left and right side sections of the main rear floor panel 8. An inner side section of the rear side member 9 is joined to the main rear floor panel 8. An outer side section of the rear side member 9 further in the vehicle back than rear wheel house inner panels 21 arranged adjacent to the rear side member 9 is joined to the side rear floor panels 12. Moreover, the rear side member 9 is provided along the main rear floor panel 8 while extending in the vehicle front-back direction. The rear side member 9 is formed in a hat shape in cross section opened in an upper part. Therefore, flanges 14 bent outward at a right angle are provided at upper ends of opposed both left and right side walls of the rear side member 9. A lower part of the back door opening section 2 is provided at a position higher than the rear side member 9.

In an upper part of the rear side member 9 in this embodiment, as shown in FIGS. 1 to 6, rear side member upper panels 10 that close the opening in the upper part and are joined to the flanges 14 on both the left and right sides is provided. Therefore, the rear side member upper panels 10 includes horizontal sections 10a joined to the flanges 14 while closing the upper part opening of the rear side member 9. At the rear ends of the rear side member upper panels 10, upright sections 10b that are formed by bending the rear end at a right angle and extend upward in the vehicle from the horizontal sections 10a are provided. Rear end sides of the rear side member upper panels 10 are formed in an L shape in side view by the horizontal sections 10a and the upright sections 10b. The upright sections 10b of the rear side member upper panels 10 are joined to a lower part of the round structure of the back door opening section 2.

The upright section 10b forms a convex shape section on an interior side while including a bent portion of the lower part in the width direction center. Consequently, it is possible to improve the rigidity of the bent portion. Since a space is formed between the upright section 10b and the back inner panel 6a, a hole of a clamp hole or the like used on the inner side can be set in a convex portion. Consequently, it is possible to set a clamp attachment hole without opening a hole in the back inner panel 6a, which is a partition wall between the interior and the external environment. Therefore, it is possible to prevent concern about a water leak and the like.

In the structure according to this embodiment, the rear side member upper panels 10, the rear side member 9, and the main rear floor panel 8 or the side rear floor panels 12 are joined in three layers in the flanges 14 of the rear side member 9. The rear side member upper panels 10 are joined to the rear wheel house inner panels 21. Therefore, in the outer side sections of the rear side member upper panels 10, joining flanges 13 standing upright opposed to the rear wheel house inner panels 21 are provided along the vehicle front-back direction. The rear wheel house inner panels 21 sides of the rear side member upper panel 10 are joined to the rear wheel house inner panels 21 via the upright joining flange 13. Note that the rear wheel house inner panels 21 are provided on the outer sides of the rear side member 9 and the rear side member upper panels 10 further in the vehicle front position than the side rear floor panels 12. The rear wheel house inner panels 21 are formed in a spherical curved shape having high surface rigidity.

Figure 4:
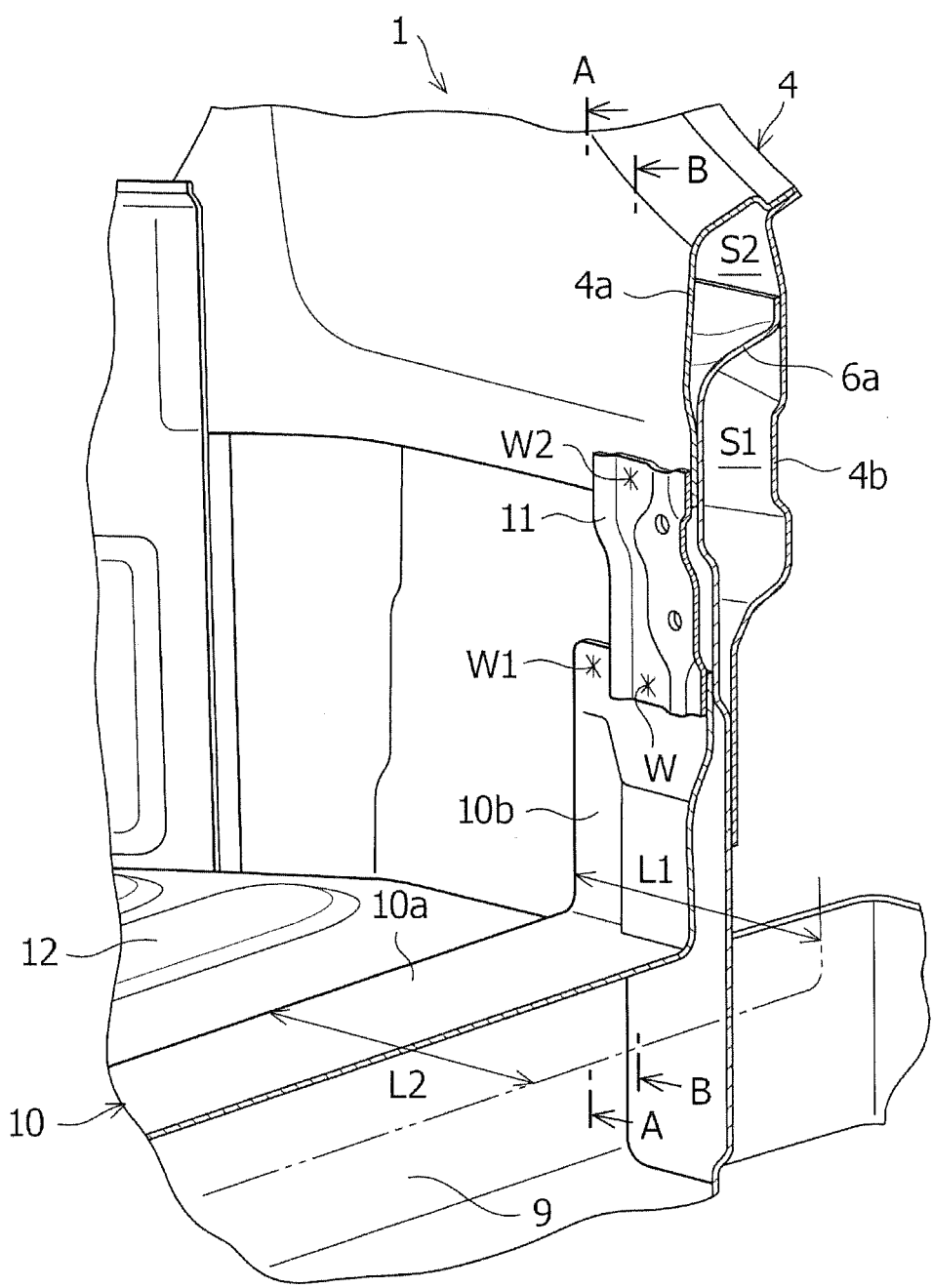
FIG. 4 is a perspective view partially showing in a cross section the arrangement relation of the components in the periphery of the upright sections of the rear side member upper panels in the vehicle body rear part of the vehicle to which the structure according to the embodiment of the present invention is applied.
Figure 6:
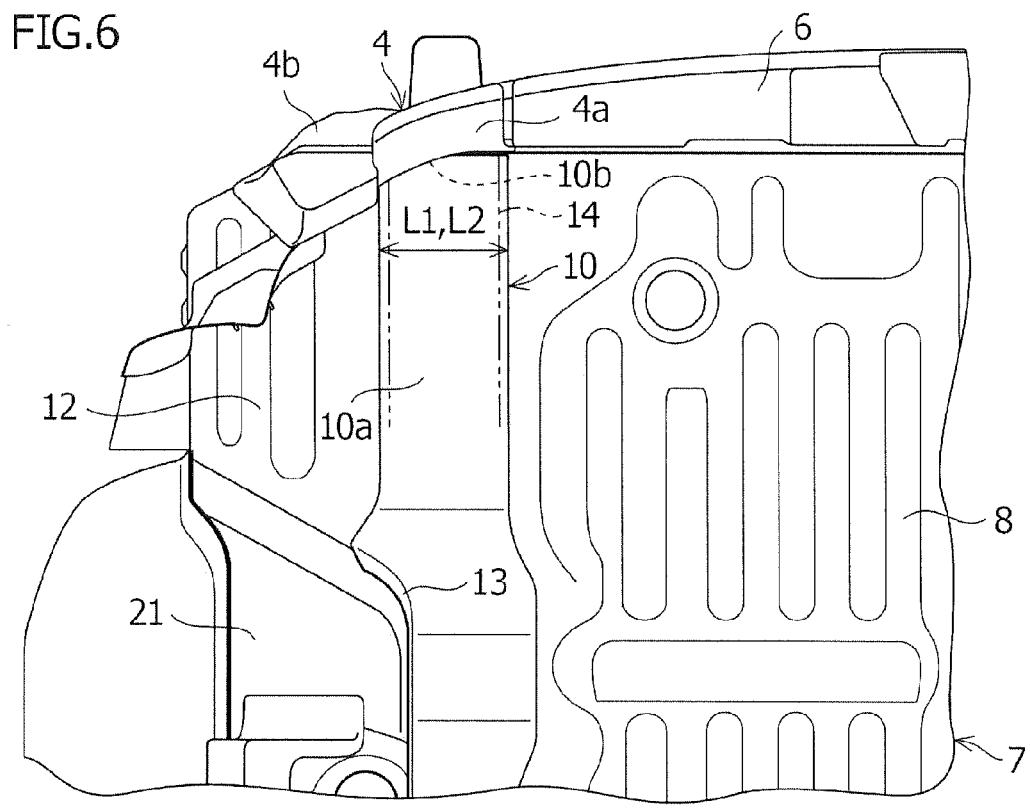
FIG. 6 is a plan view of the vehicle body rear part of the vehicle, to which the structure according to an embodiment of the present invention is applied, viewed from above the vehicle.

Furthermore, in the structure according to this embodiment, as shown in FIGS. 4 and 6, the rear side member 9 and the upright sections 10b of the rear side member upper panels 10 are arranged to overlap and the pillar inner lower panels 4a and the closed cross sections (second closed cross-sectional sections S2) of the pillar outer lower panels 4b are arranged to overlap in the up-down direction in vehicle front view. Moreover, a width dimension L1 of the upright sections 10b of the rear side member upper panels 10 are set to a size equivalent to a width dimension L2 of the rear side member 9. Joining points W1 of the upright sections 10b and the pillar section 3 are located in a range of the overlap. Therefore, for example, the joining points W1 of the upright sections 10b of the rear side member upper panels 10 and the pillar outer lower panels 4b of the pillar section 3 are arranged in a transmission path of an up-down direction load applied from the back door opening section 2.

In the structure according to this embodiment, it is possible to secure necessary coupling rigidity with a minimum increase in weight by setting the thickness of the rear side member upper panels 10 greater than the thicknesses of other peripheral components.

On the other hand, in the pillar section 3 standing from the lower part of the back door opening section 2, first closed cross-sectional sections S1 configured by joining up-down overlap portions of the back inner panel 6a of the back panel section 6 and the pillar outer lower panels 4b of the pillar lower panels 4 to each other are provided. The first closed cross-sectional sections S1 are closed cross sections in the vehicle width direction and are formed in a square shape in side view. Moreover, lower side portions of the back inner panel 6a and the pillar outer lower panels 4b located below the first closed cross-sectional sections S1 and upper end both left and right side portions of the upright sections 10b of the rear side member upper panels 10 are joined by spot welding W1 or the like in three layers as shown in FIGS. 4 and 5.

Figure 5A:
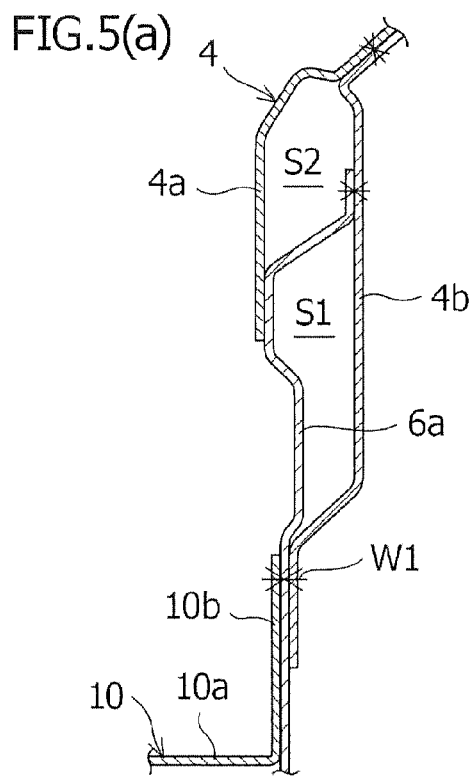
FIG. 5(a) is an A-A line sectional view of FIG. 4
Figure 5B:
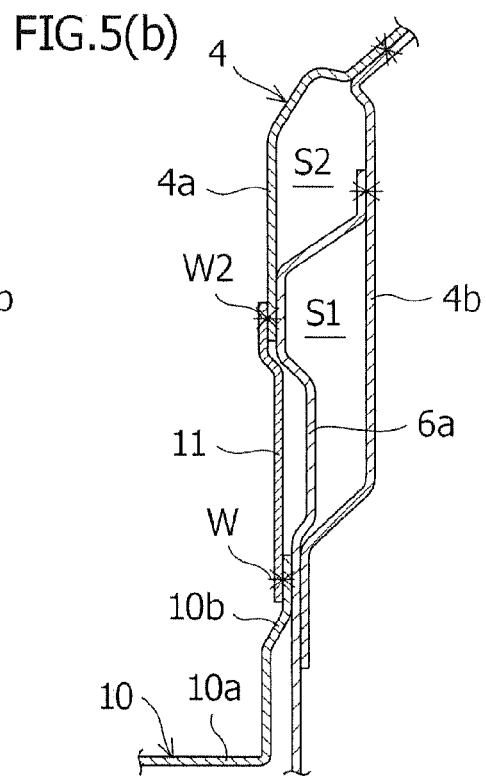
FIG. 5(b) is a B-B line sectional view of FIG. 4.

In the pillar inner lower panels 4a of the pillar lower panels 4 in this embodiment, as shown in FIGS. 4 and 5, rear ends of upper parts bent obliquely upward toward the vehicle back are joined to the pillar outer lower panels 4b. Lower ends extending downward are joined to the back inner panel 6a of the back panel section 6. Second closed cross-sectional sections S2 configured by the pillar inner lower panels 4a and the back inner panel 6a, upper and lower overlap portions of which are joined with each other, are formed. The second closed cross-sectional sections S2 are closed cross sections of the pillar section 3 in the longitudinal direction of the round structure of the back door opening section 2 and are formed in a square shape in side view. The second closed cross-sectional sections S2 are provided in upward positions of the first closed cross-sectional sections S1, which are positions adjacent to the first closed cross-sectional sections S1.

Furthermore, in the structure of the vehicle body rear part 1 according to this embodiment, as shown in FIGS. 1, 2, 4, and 5, reinforcing members 11 connecting the upright sections 10b of the rear side member upper panels 10 and the pillar inner lower panels 4a of the pillar lower panels 4 are provided along the vehicle up-down direction. Therefore, the reinforcing members 11 are formed using a panel material having a width dimension smaller than the width dimension of the upright sections 10b of the rear side member upper panels 10. The reinforcing members 11 are arranged to be located on the inner side of a joining place of the upright sections 10b.

Both the left and right sides of the upper ends of the reinforcing members 11 are joined to the lower ends of the pillar inner lower panels 4a by spot welding W2 or the like. Both the left and right sides of the lower ends of the reinforcing members 11 are joined to the upper ends of the upright sections 10b of the rear side member upper panels 10 by the spot welding W2 or the like. Consequently, members configuring the second closed cross-sectional sections S2 and the upright sections 10b of the rear side member upper panels 10 are coupled via the reinforcing members 11. An up-down direction load applied from the back door opening section 2 is easily transmitted to the rear side member upper panels 10 and the rear side member 9 through the reinforcing members 11.

As explained above, in the structure of the vehicle body rear part 1 according to the embodiment of the preset invention, both the left and right side portions in the vehicle width direction and the standing portions in the vehicle up-down direction in the back door opening section 2 of the round structure of the vehicle body rear part 1 are configured by the pillar section 3. The rear side member 9 hat-shaped in cross section extending in the vehicle front-back direction is provided on both the left and right sides of the main rear floor panel 8. The rear side member upper panels 10 configured to close the opening in the upper part and joined to the flanges 14 on both the left and right sides are provided in the rear side member 9. The upright sections 10b extending upward in the vehicle from the horizontal sections 10a are provided at the rear ends of the rear side member upper panels 10. The first closed cross-sectional sections S1 configured by the back inner panel 6a and the pillar outer lower panels 4b are provided in the pillar section 3 standing from the lower part of the back door opening section 2. The lower side portions of the back inner panel 6a and the pillar outer lower panels 4b and the upright sections 10b of the rear side member upper panels 10 are joined by the spot welding W1 in three layers. Therefore, it is possible to efficiently disperse and absorb an up-down direction load applied from the back door opening section 2, which is a load of vehicle body twisting deformation or the like, in the vehicle body structures such as the main rear floor panel 8 of the rear floor 7 and the rear wheel houses 21 through the closed cross-sectional section of the pillar section 3, the upright section 10b of the rear side member upper panels 10, and the rear side member 9. It is possible to reliably suppress vehicle body twisting deformation and the like. Moreover, in the structure of the vehicle body rear part 1 according to this embodiment, assembly of the components can be integrally performed by spot welding or the like in the vehicle body assembly process. Therefore, it is possible to further increase assembly rigidity of the components than assembly rigidity obtained when the components are assembled by being tightened by bolts later. Furthermore, it is possible to realize improvement of productivity and a reduction in costs of the vehicle.

In the structure according to this embodiment, the second closed cross-sectional sections S2 are formed by the pillar inner lower panels 4a and the back inner panel 6a, the up-down overlap portions of which are joined to each other. The second closed cross-sectional sections S2 and the first closed cross-sectional sections S2 are provided in the positions adjacent to each other. The upright sections 10b of the rear side member upper panels 10 are coupled in the positions below the second closed cross-sectional sections S2 and the first closed cross-sectional sections S1. Therefore, it is possible to improve coupling of the respective components of the vehicle body rear part 1. Furthermore, it is possible to smoothly and efficiently disperse an up-down direction load, which is applied from the back door opening section 2, to the rear side member 9, the main rear floor panel 8, and the like.

Furthermore, in the structure according to this embodiment, the reinforcing members 11 that couple the upright sections 10b of the rear side member upper panels 10 and the pillar inner lower panels 4a are provided. The upper ends of the reinforcing members 11 are joined to the pillar inner lower panels 4a by the spot welding W2. The lower ends of the reinforcing members 11 are joined to the upright sections 10b of the rear side member upper panels 10 by spot welding W. Therefore, it is easy to transmit the up-down direction load, which is applied from the back door opening section 2, to the rear side member 9 and the like via the reinforcing members 11.

In the structure according to this embodiment, the rear side member 9 and the upright sections 10b of the rear side member upper panels 10 are arranged to overlap and the pillar inner lower panels 4a and the closed cross sections (the second closed cross-sectional sections S2) of the pillar outer lower panels 4b are arranged to overlap in the up-down direction in vehicle front view. Therefore, it is possible to more efficiently disperse the up-down direction load, which is applied from the back door opening section 2, to the vehicle body structures such as the main rear floor panel 8 of the rear floor 7 and the rear wheel houses 21 through the second closed cross-sectional sections S2 of the pillar section 3, the upright sections 10b of the rear side member upper panels 10, and the rear side member 9.

Furthermore, in the structure according to this embodiment, the width dimension L1 of the upright sections 10b of the rear side member upper panels 10 is the size equivalent to the width dimension L2 of the rear side member 9. The joining points W1 of the upright sections 10b and the pillar section 3 are located within the range of the overlap. Therefore, it is possible to transmit the up-down direction load, which is applied from the back door opening section 2, to the rear side member 9 through joining sections having high rigidity. It is possible to promote the load dispersion to the rear side member 9.

In the structure according to this embodiment, the rear side member upper panels 10, the rear side member 9, and the main rear floor panel 8 or the side rear floor panels 12 of the rear floor 7 divided into three with the rear side member 9 placed therebetween in the vehicle width direction are joined in the flanges 14 of the rear side member 9 in three layers and the rear side member upper panels 10 are joined to the rear wheel house inner panels 21. Therefore, it is possible to secure, with the rear side member upper panels 10, bonding rigidity of the rear floor 7 including the round structure of the back door opening section 2, the rear side member 9, and the rear wheel house inner panels 21. Furthermore, it is possible to disperse an external load, which is applied from the vehicle back, to the structure of the vehicle body rear part 1. In other words, in the structure according to this embodiment, a load received by the rear pumper is transmitted to the vehicle body rear part 1, in particular, the back panel section 6 and the round structure of the back door opening section 2 by the bumper main suspension member and the like and dispersed to the rear side member 9 and the rear floor 7. Therefore, it is possible to directly and smoothly transmit the load from the round structure of the back door opening section 2 to the rear side member 9 through the upright sections 10b of the rear side member upper panel 10. Furthermore, it is possible to efficiently disperse the load to the rear floor 7 and the rear wheel house inner panels 21 mainly through the rear side member upper panels 10.

In the structure according to this embodiment, the joining flanges 13 standing upright opposed to the rear wheel house inner panels 21 are provided along the vehicle front-back direction in the outer side sections of the rear side member upper panels 10. The rear wheel house inner panels 21 sides of the rear side member upper panels 10 are joined to the rear wheel house inner panels 21 via the upright joining flanges 13. Therefore, it is possible to efficiently transmit an external load applied to the rear side member 9 from the vehicle back to the rear wheel house inner panels 21 having high surface rigidity and effectively absorb a moving load to the vehicle front.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vehicle body rear part comprising:
a back door opening section of a round structure provided in a vehicle body rear part;
a rear side member hat-shaped in cross-section opened in an upper part that extends in a vehicle front-back direction provided on both left and right sides of a rear floor;
a lower part of said back door opening section provided in a position higher than said rear side member, said rear floor is divided into a rear center floor and rear side floors on both the left and right sides with said rear side member placed therebetween in a vehicle width direction;
a plurality of rear wheel house inner panels arranged adjacent to said rear side member;
in said rear side members, rear side member upper panels configured to close an opening in the upper part of the rear side member and joined to flanges on both the left and right sides;
the rear side member upper panels further including a plurality of upright sections extending upward in the vehicle at rear ends of said rear side member upper panels, said upright sections being joined to the lower part of said back door opening section and standing in an "L" shape, the thickness of the upright sections being set greater than the thickness of other peripheral components, wherein:
in outer side sections of said rear side member upper panels, joining flanges standing upright opposed to said rear wheel house inner panels are provided along the vehicle front-back direction;
said rear side member upper panels are joined to said rear wheel house inner panels via said joining flanges;
in a position higher than said rear side member upper panels, a closed cross-section in the lower part of said back door opening section is provided;
both left and right side portions in the vehicle width direction and standing portions standing from both the left and right side portions in a lower portion of the round structure of said back door opening section are configured by a pillar section, said pillar section standing from the lower part of said back door opening section is formed by a continuous closed cross-section; and the upright sections of said rear side member upper panels are joined to a member that forms the closed cross-section of said pillar section; and a reinforcing member connecting at least one of the upright sections of the rear side member upper panel and a lower part of the pillar section is provided along the vehicle up-down direction, an upper end of the reinforcing member is joined to the lower part of the pillar section, a lower end of the reinforcing member is joined to an upper end of the upright section of the rear side member upper panel, and the upright section of the rear side member upper panel and a member configuring a closed cross-section of the pillar section are coupled via the reinforcing member.

2. The vehicle body rear part of claim 1, wherein the upright section of the rear side member upper panel is spaced away from the lower part of the pillar section.

\* \* \* \* \*